United States Patent [19]

Kishi

[11] Patent Number: 4,522,270

[45] Date of Patent: Jun. 11, 1985

[54] HAND-HELD ELECTRIC TOOL

[75] Inventor: Ichiro Kishi, Hikone, Japan

[73] Assignee: Matsushita Electric Works, Ltd., Osaka, Japan

[21] Appl. No.: 509,773

[22] Filed: Jun. 30, 1983

[30] Foreign Application Priority Data

Jul. 16, 1982 [JP] Japan .................. 57-124706

[51] Int. Cl.³ .............................. B25G 1/00
[52] U.S. Cl. .................. 173/163; 81/177.1;
74/421 A; 74/543; 408/124
[58] Field of Search .......... 173/29, 41, 40, 45,
173/171, 46, 5, 12, 146, 163, 169; 81/177 ST,
177.8, 177.9, 177 E, 428 R, 177 R; 74/543, 547;
7/167, 168; 145/61 L; 227/10; 16/110 R;
403/85, 83, 84

[56] References Cited

U.S. PATENT DOCUMENTS

| 1,301,802 | 4/1919 | Anderson | 145/65 X |
| 1,665,240 | 4/1928 | Weaver | 145/71 |
| 1,835,943 | 12/1931 | Hoss | 145/71 |
| 2,572,444 | 10/1951 | Carden | 145/65 X |
| 2,630,730 | 3/1953 | Thornton | 81/177 ST |
| 2,789,597 | 4/1957 | Torre | 81/55 |
| 3,528,510 | 9/1970 | Peterson | 173/148 |
| 3,687,179 | 8/1972 | Totsu | 81/475 |
| 3,905,429 | 9/1975 | Berger | 173/163 |
| 4,158,970 | 6/1979 | Laughon | 81/475 X |
| 4,215,594 | 8/1980 | Workman, Jr. et al. | 173/12 X |

FOREIGN PATENT DOCUMENTS 3984472 9/1973 United Kingdom ............ 145/61 G

Primary Examiner—E. R. Kazenske
Assistant Examiner—James Wolfe
Attorney, Agent, or Firm—Stevens, Davis, Miller & Mosher

[57] ABSTRACT

A hand-held electric tool comprising an elongated housing having a first longitudinal axis and provided with a motor-driven chuck projecting from the forward end thereof, an elongated grip having a second longitudinal axis and connected at its forward end to the rearward end of the housing. An electric motor is positioned within the housing for rotatably driving a suitable bit held in the chuck to perform fastening or drilling operation. The grip is connected to the housing in such a way as to be selectively switched between two positions, that is, a straight position where the first and second longitudinal axes are in alignment and an angled position where the first axis crosses the second axis. In the preferred embodiment, the grip and the housing are pivotally interconnected at a pivot axis to permit the grip to swing about the pivot axis between the straight and angled positions.

11 Claims, 14 Drawing Figures

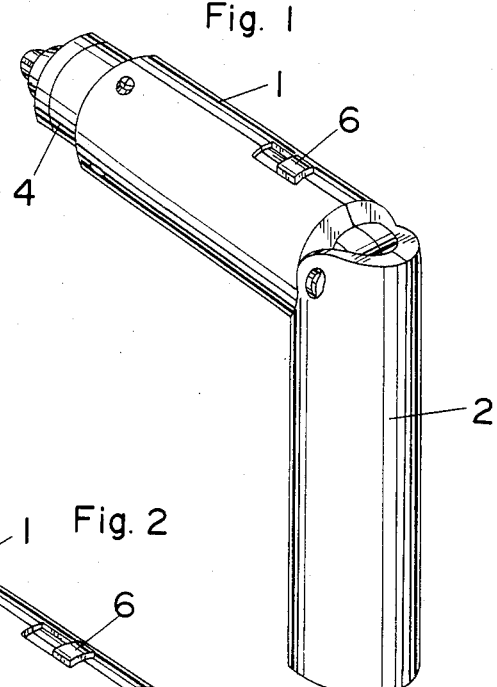
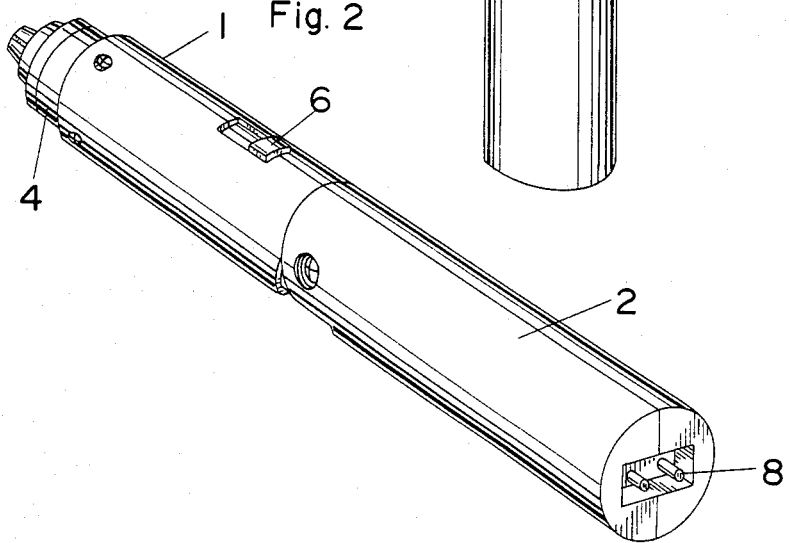
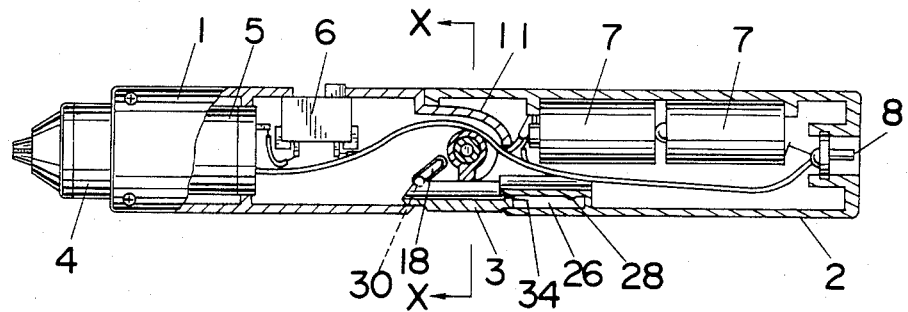

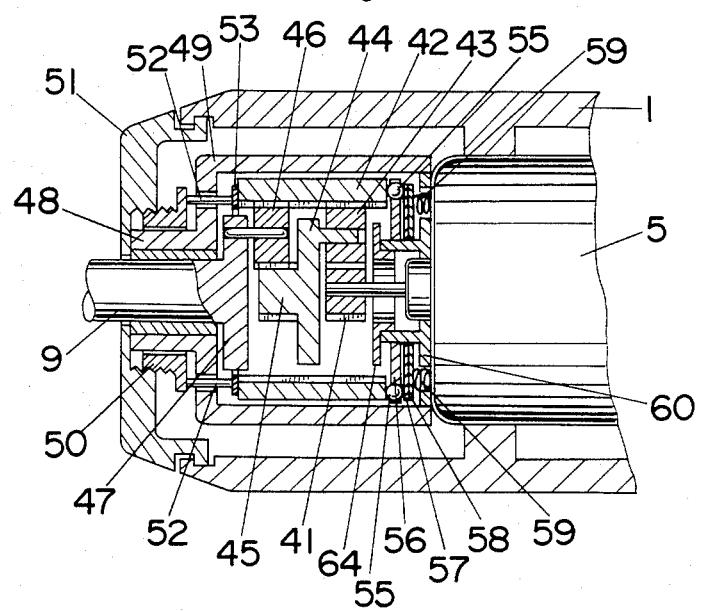

HAND-HELD ELECTRIC TOOL

BACKGROUND OF THE DISCLOSURE

1. Field of the Invention

This invention is directed to a hand-held electric tool, more particularly to a hand-held tool for fastening and drilling operations by the use of a corresponding bit attached thereto and rotatably driven by an incorporated electric motor.

2. Description of the Prior Art

There has been provided electric tools of this type, as disclosed in U.S. Pat. Nos. 2,789,597 and 3,687,179 comprising a single housing in which an electric motor rotatably drives a suitable bit locked in a chuck. These tools are utilized by grasping the housing to perform an intended driving operation. However, these tools with a single housing are of a relatively bulky mass to be grasped by the hand of an operator and are sometimes inconvenient to use because the housing itself constitutes a hindrance when the driving operation needs to be performed in a limited space.

SUMMARY OF THE INVENTION

The above disadvantages of the prior hand-held electric tools are obviated by the present invention which provides a novel and improved construction of a hand-held electric tool, allowing an operator to handle the tool in two different operating positions depending upon the available space. The electric tool in accordance with the present invention comprises an elongated housing having a first longitudinal axis and provided with a motor-driven chuck projecting from the forward end thereof, and an elongated grip having a second longitudinal axis, the grip being pivotally connected at its forward end to the rear end of the housing so as to permit the operator to selectively assume a straight position where the first longitudinal axis is in line with the second longitudinal axis or an angled position where the two axes are crossed. This feature enables the tool to be manipulated by the operator to form the straight construction or the angled construction in order to be brought into a proper and easy handling position for use at different working locations and against workpieces. Also with this feature, the tool can be arranged or packed within a relatively small space as in a toolbox and the like by selecting the straight or angled position depending upon the size and shape of storage space.

In a preferred embodiment of the present invention, there is disclosed a useful structure in which the grip is pivotally connected to the housing so as to effectuate easy and prompt conversion between the above two positions, and the motor is mounted in the housing while an electric battery to be electrically connected thereto is mounted in the grip in order to properly balance the tool for one-hand operation.

The present invention preferably has a retractable cover which telescopes over the grip when moving from the angled position to the straight position to cover the gap formed between the confronting ends of the housing and the grip when in the straight position, preventing the fingers of the operator from being inadvertently nipped in the gap and providing a smooth fit between the tool and the hand grasping it. Besides the above, the retractable cover has means for retaining the grip in both straight and angled positions to prevent its movement unless a force is applied to shift the position of the grip.

Accordingly, it is a primary object of the present invention to provide a hand-held electric tool which is easy to use and efficient in operation, as well as is easily arranged and stored within a relatively small space with the housing and grip aligned or crossed with respect to each other.

Another object of the present invention is to provide an electric tool capable of being readily and promptly shifted between two operating positions.

Still another object of the present invention is to provide a properly balanced tool which is easily manipulated with one hand.

A further object of the present invention is to provide an electric tool which eliminates accidental nipping of the fingers grasping the tool and thereby assuring a comfortable grip.

Another object of the present invention is to provide an electric tool which is free from movement of the grip in relation to the housing so as to ensure stable operation.

Other objects and advantages of the present invention will become more apparent upon reading the following detailed description, taken together with the accompanying drawings, showing a preferred embodiment of the invention.

BRIEF DESCRIPTION OF THE DRAWINGS

FIG. 1 is a perspective view showing a hand-held electric tool with the grip arranged in the angled position in accordance with the present invention;

FIG. 2 is a perspective view showing the tool with the grip extended in the straight position;

FIG. 3 is a side view showing a partial cross-section of the electric tool;

FIG. 12 is a fragmentary enlarged longitudinal section showing the interior construction of the speed reduction means in which the torque limiting clutch is disengaged.

DETAILED DESCRIPTION OF THE PREFERRED EMBODIMENT

Figure 4:
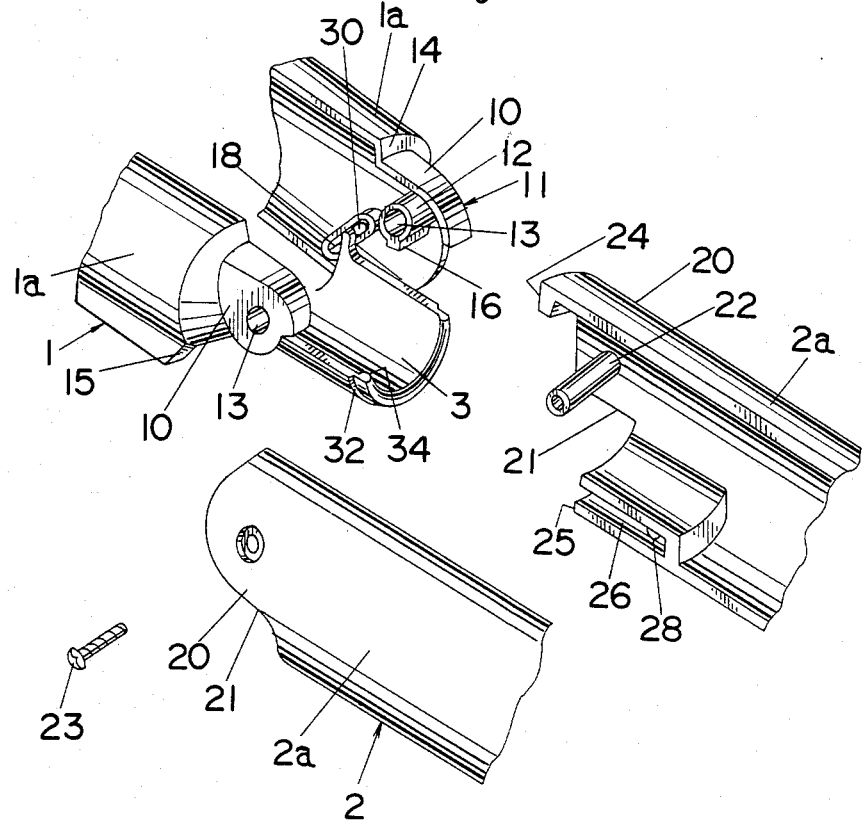
FIG. 4 is an exploded perspective view showing the parts interconnecting the housing and the grip of the tool.
Figure 5:
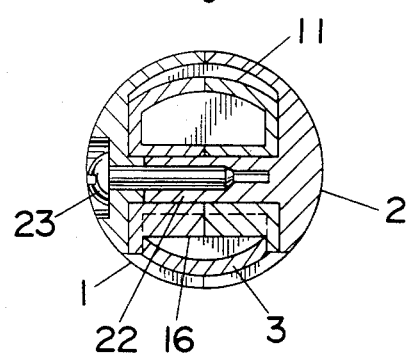
FIG. 5 is a transverse sectional view taken along a line substantially corresponding to the line X—X in FIG. 3.

Referring now to the drawings, and particularly to FIGS. 1-3, there is shown a hand-held electric screwdriver as a preferred embodiment of the present invention, including an elongated cylindrical housing 1 having a first longitudinal axis and an elongated cylindrical grip 2 having a second longitudinal axis and pivotally connected at its forward end to the rearward end of the housing 1. Within the housing 1 are mounted an electric motor 5 and speed reduction means, the details of which will be hereinafter explained. A chuck 4 for holding a screwdriver bit (not shown) projects coaxially from the forward end of the housing 1 and is operatively connected to the motor 5 so as to be rotatably driven thereby. The housing 1 also carries an electric slide switch 6 for electrically connecting and disconnecting the motor 5 to and from an electric battery 7 disposed within the grip 2. The battery 7 consists of a series of rechargeable battery cells and is supplied with electricity, when required, through a pair of terminals 8 at the rear of the grip 2, which are adapted to be detachable connected to a battery charger (not shown). Both housing 1 and grip 2 are made of synthetic resin and have approximately equal diameter and length. As is shown in FIG. 4, the housing 1 is constructed of a pair of two halves 1a, each of which has one part of a pair of cooperating projections 10 at its rear end, such projections being held together to form a pivot tang 11. The grip 2 is also constructed of a pair of halves 2a, each having at its forward upper side a yoke 20 projecting longitudinally to define at the forward lower side thereof a recessed portion 21. Formed integrally with one of the yokes 20 is a hollow post 22 projecting inwardly thereof and in a direction perpendicular to said second longitudinal axis. Each projection 10, forming the pivot tang 11, has an inwardly projecting hub 12, with a bore 13 extending therethrough. These hubs 12 are combined when two halves 1a are held together to form a pivot bearing, through which said hollow post 22 extends to pivotally connect grip 2 to housing 1, and grip 2 is permitted to pivot in a plane including said first and second longitudinal axes about the hollow post 22, which defines a pivot axis. A screw 23 engages threadedly into the hollow post 22 to unite the two halves 2a into the grip 2, while retaining the hollow post 22 in rotatable engagement within said pivot bearing, as well as overlapping the pivot tang 11 with the yokes 20. At the upper and lower forward ends of the grip 2 are formed respectively first and second stops 24 and 25, which are circumferentially spaced apart along a circle having the coincident center with with hollow post 22, so that the grip 2 can be rotated relative to the housing 1 in one direction until the first stop 24 abuts against a first seat 14 on the upper rearward end of the housing 1 to assume a straight position, where said first and second longitudinal axes are in line with each other and that the grip 2 can be rotated in the opposite direction until the second stop 25 abuts against the second seat 15 on the lower rearward end of the housing 1 to assume an angled position, where said first and second longitudinal axes cross one another at approximately right angles. Thus, the grip 2 is limited to swing about the pivot axis relative to the housing 1 between such straight and angled positions.

Figure 6:
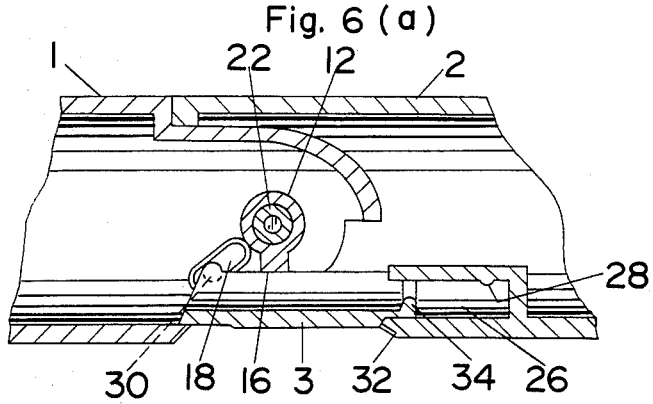
FIGS. 6a and 6b are enlarged longitudinal sectional views showing the portion interconnecting the housing and the grip respectively in its straight position and angled position.
Figure 6:
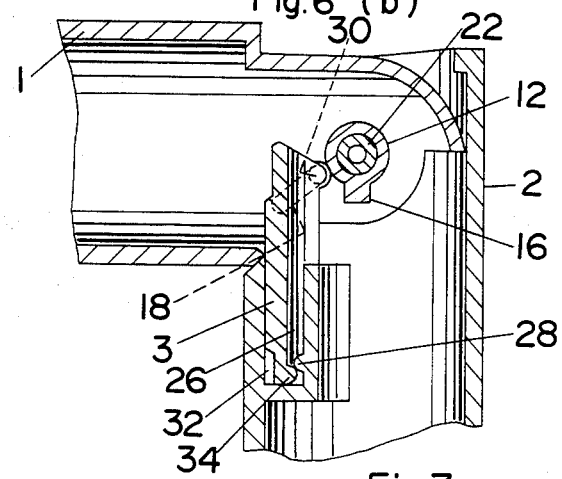
Figure 7:
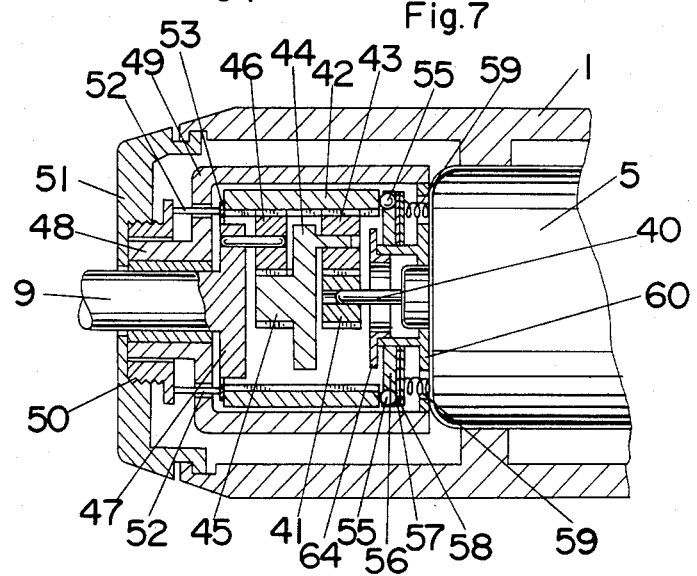
FIG. 7 is a fragmentary enlarged longitudinal section showing the interior construction of the speed reduction means employed in the electric tool in which a torque limiting clutch is engaged.

Disposed between the lower rearward end of the housing 1 and the lower forward end of the grip 2 is a retractable cover 3, which telescopes internally of the grip 2, that is, the cover 3 is to be disposed on the side which will constitute the inside of the corner formed by the housing 1 and the grip 2 when in said angled position. The retractable cover 3 has at its forward end a pair of outwardly projecting pins 30, which are slidably and pivotally received within the corresponding grooves 18, respectively formed on the interior of the halves 1a and elongated along an oblique axis inclined at approximately 45 degrees to said first longitudinal axis. The rear portion of the retractable cover 3 is slidably received within a longitudinally and circumferentially elongated channel 26, provided within the lower forward portion of the grip 2, with its open end exposed adjacent said recessed portion 21. Accordingly, as shown in FIG. 6a, the cover 3 will extend from the channel 26 to close a gap between the lower portions of the housing 1 and the grip 2 when the tool is extended in said straight position, such gap being largely defined by said recessed portion formed at the lower forward end of the grip 2. As the grip 2 is moved from the straight position to the angled position, the cover 3 will gradually retract into the channel 26 and be received within the grip 2 when the grip 2 is in the angled position, as shown in FIG. 6b. In the straight position, as shown in FIG. 6a, the upper lateral edge of the cover 3 abuts intermediate its longitudinal ends against a rib 16, projecting radially from said hub 12 so as to prevent the accidental inward movement of the cover 3 due to the external force which may be applied thereto by the finger of an operator grasping the tool. Also, in this position, the lower extremity of the forward end of the grip 2 snaps into the cutout 32 formed at the outer rear end of the cover 3 to retain the cover 3 in position, which in turn prevents inadvertent swinging or rotating movement from the angled position of the grip 2 relative to the housing 1. The cover 3 is further provided with a hook 34, projecting upwardly from the rear end thereof, which snappedly engages with a node 28 projecting inwardly of the rear portion of the channel 26 when the grip 2 is in the angled position, as seen in FIG. 6b, such that the cover 3 locks the grip 2 to likewise prevent inadvertent and unnecessary swinging movement thereof from this position. As is apparent from the above arrangement of the retractable cover 3, the cover 3 acts not only to prevent the fingers of the operator from accidentally being nipped when the tool is in the straight position, but also to restrict inadvertent movement of the grip 2 to retain it both in the straight and the angled positions.

Figure 8:
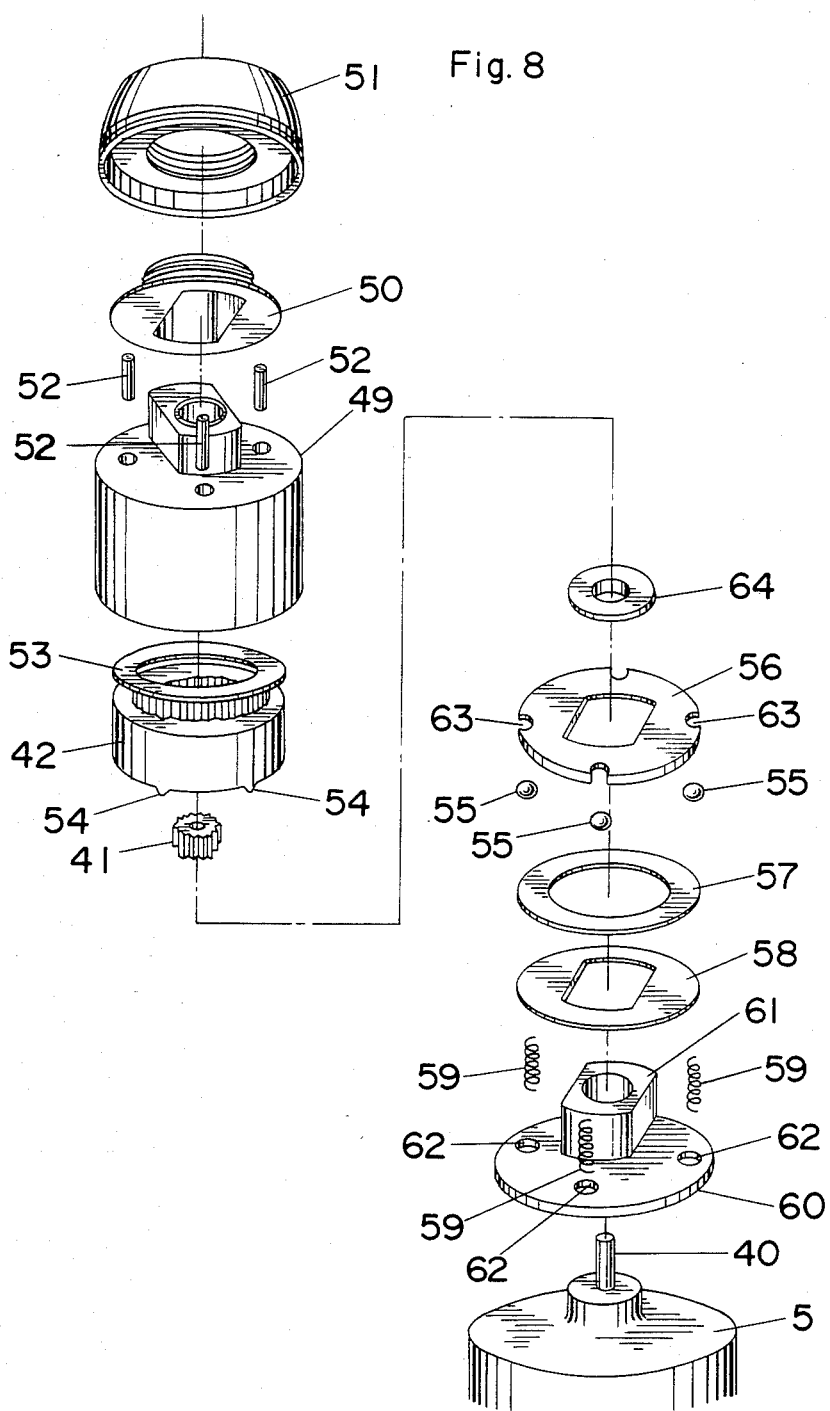
FIG. 8 is an exploded perspective view showing the parts of the above speed reduction means.
Figure 9:
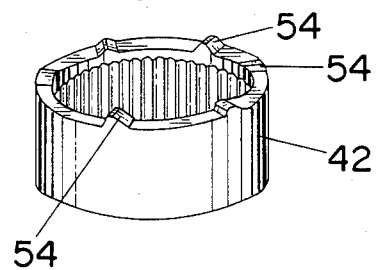
FIG. 9 is a perspective view of the internal gear composing the above speed reduction means.
Figure 10A:
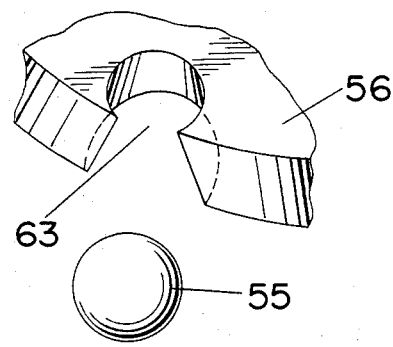
FIG. 10a is an exploded fragmentary perspective view showing a part of the retainer ring composing the speed reduction means and the ball to be retained thereby.
Figure 11:
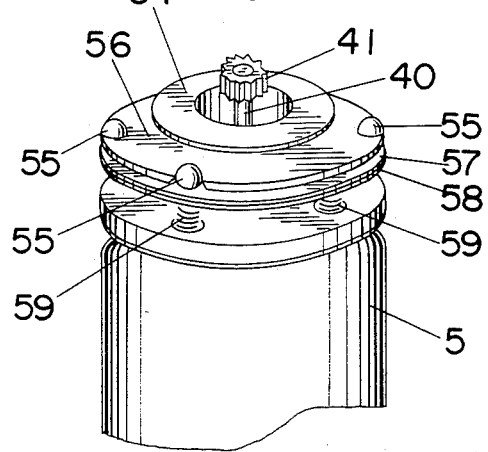
FIG. 11 is a fragmentary perspective view showing parts of the speed reduction means half assembled with the retainer ring kept in position by the sleeve.
Figure 10B:
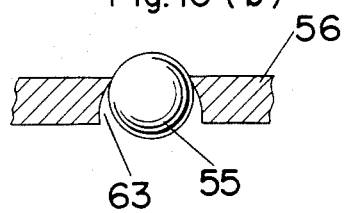
FIG. 10b is a fragmentary sectional view of the above retainer ring and the ball seated therein.

Referring now to FIGS. 7-12, there is shown the detailed structure of said speed reduction means which, composed of a double planetary gear train and a torque limiting clutch for protecting the motor 5 against overload, provides a driving connection between the motor 5 and the drive spindle 9 carrying the chuck 4. The double planetary gear train includes a first sun gear 41 fixed on the output shaft 40 of the motor 5, a coaxial internal gear 42 which is axially slidable, a set of circumferentially spaced first planet gears 43 supported on a first planet carrier 44, a second sun gear 45 formed centrally of and integrally with the first planet carrier 44, a set of circumferentially spaced second planet gears 46 intermeshing with the gears 45 and said internal gear 42 and supported on a second planet carrier 47, from the center of which forwardly projects said drive spindle 9 which is rotatably journaled in the bearing received in a concentric hub 48 projecting forwardly from the gear casing 49, fixedly and coaxially mounted within the housing 1 forwardly of the motor 5. Disposed on the hub 48 is an intermediate ring 50, which is axially slidable and rotatively fixed with respect to the gear casing 49 and which threadedly engages with a torque adjusting ring 51 rotatably attached to the front end of the housing 1. Between the intermediate ring 50 and said internal gear 42 are disposed a set of circumferentially spaced apart pins 52 which extend through the front face of the gear casing 49, with their respective front ends abutting against the rear end of the intermediate ring 50 and their respective rear ends abutting through a washer 53 against the front end of the internal gear 42, so as to convert the rotational movement of the torque adjusting ring 51 into the longitudinal or axial movement of the internal gear 42. As shown in FIGS. 8 and 9, said internal gear 42 has, on its rear end, a plurality of axially projecting teeth 54, which are angularly spaced about the axis of the internal gear 42. The internal gear 42 with these teeth 54 is connected by means of a series of circumferentially spaced balls 55 to a clutch plate 57, which is rotatably and slidably mounted on a boss 61, coaxially projecting from a base 60 secured to the front end of the motor 5. The balls 55 are seated respectively in the circumferentially spaced sockets 63, formed in a retainer ring 56 located between the internal gear 42 and the clutch plate 57, such balls 55 cooperating with said teeth 54 on the internal gear 42 to provide the torque-limiting clutch. The clutch plate 57 is biased against the internal gear 42 by means of compression springs 59, which are seated at their respective rear ends in the holes 62 formed in the base 60 and engage at their respective front ends with a washer ring 58, which is rotatively fixed and slidably mounted on the boss 61 so as to be arranged in frictional engagement with the clutch plate 57. The compression force exerted by the springs 59 tends to keep the balls 55 in engagement with the teeth 54, so as to arrest or lock the internal gear 42 in non-rotatory position, wherein the output shaft 40 of the motor 5 drives the first and second planet gears 43 and 46 to revolve along the stationary internal gear 42 in order to rotate the drive spindle 9 about its axis, whereby the drive torque of the output shaft 40 is transmitted to the drive spindle 9 via the double planetary gear train. When the torque load on the internal gear 42, during the driving operation of the tool, such as for tightening the screw, reaches a predetermined magnitude which is determined by the load on the springs 59, the teeth 54 of the internal gear 42 thrusts the balls 55 rearward, as shown in FIG. 12, and, at the same time, roll over the balls 55 so that the internal gear 42 starts rotating about its axis in the opposite direction to the rotating direction of the drive spindle 9, breaking the drive connection between the drive spindle 9 and the output shaft 40 to protect the motor from being overloaded. The magnitude of torque at which the teeth 54 roll over the balls 55 to permit the rotational movement of the internal gear 42 is adjusted by varying the compression load on the springs 59. This adjustment is effected by turning said torque adjusting ring 51 at the front end of the housing 1, that is, turning the ring 51 moves said intermediate ring 50 axially, which in turn, moves the internal gear 42 axially by use of the pins 52 and the washer 53 to vary the tension load on the springs 59. Each socket 63 for retaining the ball 55 is shaped in the form of a tapered bore having at the front face of the retainer ring 56 a smaller opening with a diameter slightly smaller than that of the ball 55, so that the balls 55 can be retained in and thus prevented from springing out of the respective sockets 63 when the parts are half assembled, as shown in FIG. 11, wherein a stop member 64 is pressed fixedly into the base 60 with its flange resting on the inner periphery of the front face of the retainer ring 56.

The above description and particularly the drawings are set forth for purposes of illustration only. It will be understood that many variations and modifications of the embodiment herein described will be obvious to those skilled in the art, and may be carried out without departing from the spirit and scope of the invention.

I claim:

1. An electric tool adapted in use to rotatably drive a bit for fastening, drilling and like operations by an electric motor incorporated therein, comprising:
    an elongated housing having a first longitudinal axis and housing said motor and a check for holding the bit, drivingly connected thereto, the chuck being accessible from the forward end of the housing;
    an elongated grip having a second longitudinal axis; and
    said grip being connected at its forward end to the rearward end of the housing by pivot means so as to be selectively pivotal between a straight position where the second longitudinal axis thereof is in line with the first longitudinal axis of the housing or an angled position where the second longitudinal axis thereof crosses with the first longitudinal axis of the housing;
    said pivot means comprising a stationary member on either the rearward end of the housing or the forward end of the grip, and a movable member on the other of said rearward end of the housing or forward end of the grip;
    said stationary member comprising (a) a pivot tang of smaller dimension than said housing or grip, (b) a main pivot axis near the distal end of said pivot tang, (c) a retractable cover carried by said stationary member having a proximal end pivotally supported on a secondary axis parallel to said main pivot axis and a distal end projecting outwardly and parallel to said pivot tang; said movable member comprising (a) an open end encompassing the stationary member, except the retractable cover, when the tool is in its straight position; (b) means interconnecting with said main pivot axis to hinge said movable member thereon; (c) means positioned to slidably receive the distal end of said retractable cover so that when said tool is in straight position, the stationary member is substantially encompassed by the open end and the retractable cover and when said tool is in its angled position, the major portion of said retractable cover is slid into said receiving means.

2. The electric tool of claim 1, wherein said grip accommodates an electric battery which is electrically connected to the motor mounted within the housing.

3. The electric tool as set forth in claim 1, wherein said retractable cover has means for restricting the swinging movement of the grip about the pivot axis to retain it in the straight position or the angled position.

4. The tool of claim 1, including slot means mounting the secondary axis so that the proximal end of the retractable cover is movable toward and away from the main pivot axis.

5. The tool of claim 1, in which the distal end of the retractable cover has a cutout portion which overlaps the end of the channel to lock the cover in place.

6. The tool of claim 1, including detent means in said receiving means to lock the retractable cover when slid into the receiving means.

7. The electric tool of claim 1 including a gear reduction means between the motor and the chuck.

8. The electric tool of claim 7 wherein said grip accommodates an electric battery which is electrically connected to the motor mounted within the housing.

9. The electric tool as set forth in claim 7, wherein said retractable cover has means for restricting the swinging movement of the grip about the pivot axis to retain it in the straight position or the angled position.

10. The electric tool of claim 1 including a torque limiting clutch between the motor and the chuck.

11. An electric tool adapted in use to rotatably drive a bit for fastening, drilling and like operations by an electric motor incorporated therein, comprising:

an elongated housing having a first longitudinal axis and housing said motor and a chuck for holding the bit, drivingly connected thereto, the chuck being accessible from the forward end of the housing;

an elongated grip having a second longitudinal axis; and said grip being connected at its forward end to the rearward end of the housing by pivot means so as to be selectively pivotal between a straight position where the second longitudinal axis thereof is in line with the first longitudinal axis of the housing or an angled position where the second longitudinal axis thereof crosses with the first longitudinal axis of the housing said pivot means having a pivot axis perpendicular to said first and second longitudinal axes to permit the grip to pivot about the pivot axis and a retractable cover which mounted to telescope and to close the gap opened at the portion between the rearward end of the housing and the forward end of the grip when the grip is in said straight position.

* * * * *